(12) United States Patent
McCloud et al.

(10) Patent No.: US 8,611,340 B2
(45) Date of Patent: Dec. 17, 2013

(54) SMOOTH EDGE DISTORTION IN BROADBAND CHANNEL INTERPOLATION VIA VIRTUAL PILOT EXTRAPOLATION

(75) Inventors: Michael L. McCloud, San Diego, CA (US); Brian C. Banister, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 447 days.

(21) Appl. No.: 12/614,435

(22) Filed: Nov. 8, 2009

(65) Prior Publication Data

US 2010/0195518 A1 Aug. 5, 2010

Related U.S. Application Data

(60) Provisional application No. 61/148,972, filed on Feb. 1, 2009.

(51) Int. Cl.
*H04L 5/02* (2006.01)

(52) U.S. Cl.
USPC ............ 370/352; 370/252; 375/316; 375/346

(58) Field of Classification Search
None
See application file for complete search history.

(56) References Cited

U.S. PATENT DOCUMENTS

| | | | |
|---|---|---|---|
| 2004/0131012 A1 | 7/2004 | Mody et al. | |
| 2007/0002981 A1* | 1/2007 | Gaikwad et al. | 375/346 |
| 2008/0232488 A1 | 9/2008 | Sandell et al. | |
| 2011/0122979 A1* | 5/2011 | Wang et al. | 375/355 |

FOREIGN PATENT DOCUMENTS

| EP | 1968224 A1 * | 9/2008 |
|---|---|---|
| EP | 1968268 | 9/2008 |

OTHER PUBLICATIONS

Dateki, T. et al: "New OFDM Channel Estimation Method by Adding a Virtual Channel Frequency Response," 2006 IEEE 64TH Vehicular Technology Conference: VTC 2006-Fall; Sep. 25-28 2006, pp. 1-5.
Huang, Li et al: "Pilot-Aided Channel Estimation for Systems with Virtual Carriers," Communications, 2006. ICC 06. IEEE International Conference, Jun. 1, 2006, pp. 3070-3075.
International Search Report—PCT/US2010/022680—International Search Authority—European Patent Office, Apr. 8, 2010.
Jeong-Wook Seo et al: "An Enhanced DFT-Based Channel Estimation Using Virtual Interpolation with Guard Bands Prediction for OFDM," The 17th Annual International Symposiym on Personal, Indoor and Mobile Radio Communications, Sep. 1, 2006, pp. 1-5.
Jeong-Wook Seo et al: "DFT-Based PSA Channel Estimation Using Linear Prediction for OFDM Systems with Virtual Carriers," Vehicular Technology Conference, vol. 1, May 30, 2005, pp. 510-513.
Namba, H. et al: "New Virtual Sub-Carrier Allocation Method for CI Multiplexed Channel Estimation Signals on MIMO-OFDMA," The 18th Annual IEEE International Symposium on Personal, Indoor and Mobile Radio Communications, Sep. 1, 2007, pp. 1-5.
Written Opinion—PCT/US2010/022680, ISA/EPO, Apr. 8, 2010.
Taiwan Search Report—TW099102867—TIPO—Mar. 21, 2013.

* cited by examiner

*Primary Examiner* — Kibrom T Hailu
*Assistant Examiner* — Zewdu A Beyen
(74) *Attorney, Agent, or Firm* — Stanton Braden

(57) ABSTRACT

In the basic transform domain (linear filtering interpolation) technique for channel estimation at the receiver in a wireless communication system, the improvement of providing channel estimation at the receiver with computational efficiency, comprising:
extending the pilot support to move the effective edges of the pilot data further from the channel span of interest, that corresponds to data transmission.

6 Claims, 11 Drawing Sheets

Minimum bandwidth configuration (6 resource blocks), 64 QAM, EVA 5 Hz, SIMO

Comparison of IFFT/FFT, frequency domain windowing plus IFFT/FFT, and extrapolation plus IFFT/FFT channel estimation approaches for a single path fading channel Comparison of IFFT/FFT, frequency domain windowing plus IFFT/FFT, and extrapolation plus IFFT/FFT channel estimation approaches for the pedestrian A channel Comparison of IFFT/FFT, frequency domain windowing plus IFFT/FFT, and extrapolation plus IFFT/FFT channel estimation approaches for the vehicular A channel (100 Hz Doppler)

SMOOTH EDGE DISTORTION IN BROADBAND CHANNEL INTERPOLATION VIA VIRTUAL PILOT EXTRAPOLATION

The present application for patent claims priority to provisional application No. 61/148,972 filed Feb. 1, 2009, and assigned to the assignee hereof and hereby expressly incorporated by reference herein.

BACKGROUND

1. Field

The present invention relates to allowing computational efficiency of the basic transform domain approach to be achieved by first artificially extending the pilot support to move the effective edges of the pilot data further from the channel span of interest in broadband channel interpolation.

2. Background

Modern air-interface standards employ transit waveforms where known "pilot" tones are placed at regular location in the time frequency grid, wherein these pilots allow the channel to be estimated at the receiver at these locations, since the channel input is perfectly known. That is, by collecting the received signal at set pilot locations which occur at the same time but at different frequency locations, a receiver can interpolate the entire broadband frequency response for this time location.

Similarly, the entire time response for a given frequency location can be interpolated, so that, in this way, the computationally intensive two-dimensional time frequency channel interpolation is decomposed into two independent one dimensional interpolation problems (i.e. first in frequency and then in time).

However, to achieve the frequency domain interpolation with reasonable complexity, it is common to employ standard convolutional approaches, such as zero insertion between pilots followed by linear filtering. To minimize complexity this upsampling is implemented by employing a transform domain interpolation, i.e. a discrete inverse Fourier transform (IDFT, implemented through a butterfly decomposition as an IFFT with some mix of prime radixes) of the signal samples at the regularly spaced pilot locations followed by a zero padding operation in the complimentary transform domain together with any transform domain averaging and/or denoising), and a larger size forward FFT is employed to obtain uniformly interpolated samples in the original domain.

However, these methods suffer from distortion at the edges of the sample support due to the failure of a convolutional interpolator at the edges of the pilot data support (i.e. Gibb's phenomenon). This results in decreased channel quality at the edge tones, and ultimately in a loss of information throughput, thereby limiting the rate and quality of the overall communication link.

There is a need to provide a method of channel estimation at the receiver in a wireless communication system that provides computational efficiency of the basic transform domain approach to be accomplished by first extending the pilot support to move the effective edges of the pilot data further from the channel span of interest.

SUMMARY

Embodiments disclosed herein address the above stated needs by exploiting the correlation structure of the received data itself to extrapolate, or predict, additional pilot data.

Aspects of exploiting the correlation structure of the received data is a resulting system that has similar complexity to the original linear filtering (or transform domain) interpolation techniques, but with an improved performance at the band edges, and is of particular utility to frequency-duplexed multiple access systems, wherein a user has a substantial amount of information containing signal content at the band edges.

DETAILED DESCRIPTION

Figure 1:
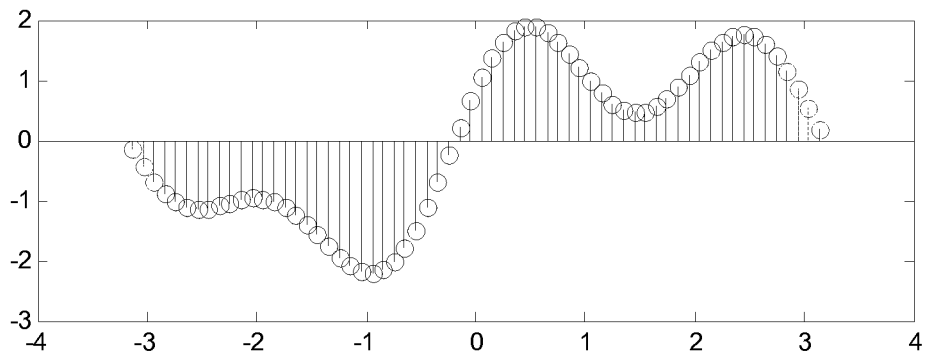
FIG. 1 is a graph illustrating the edge problem in a frequency domain channel.

The invention exploits the correlation structure of the channel response itself, rather than any prior models, to predict additional pilot support, thereby moving the effective band edges outside of the channel span of interest (i.e. that which corresponds to data transmission). This is achieved with complexity similar to highly efficient linear lag invariant filter (implemented in either transform domain) interpolation structures, and can be inserted into such with minimal overhead. For frequency duplexed multiple access systems, such as OFDMA, and broadband systems which employ broadband common pilots (such as LTE, Wimax, DVBH, etc.), the resulting performance is substantially improved.

The LTE standard (and many related OFDM based standards, such as Wimax) provides common reference signals (or pilots) that span the entire system bandwidth. Each mobile is required to demodulate symbols across the entire bandwidth. As a result, the mobile must maintain a channel estimate for each reference element in the LTE subframe across time, frequency, and transmit/receive antenna pairs.

The most straightforward approach to the frequency domain interpolation is to employ an IFFT-based estimator, wherein a brick wall window is applied in the time domain to remove alias terms. This windowing results in a Gibb's phenomenon at the band edges, however, which leads to unreliable band edge performance. We propose a frequency domain extrapolation approach to mitigate this issue, wherein the correlation properties within the reference signal support are used to artificially extend the frequency support of the estimation input (i.e., to push the Gibb's phenomenon out of the useful band).

After the pilot tone locations are descrambled, i.e. multiplied by the conjugate of the transmitted pilot symbols, we have a decimated channel estimate vector for each transmit-receive antenna pair (p,q) at pilot time location n (indexed over time domain symbols containing pilots). For convenience, we define a frequency domain destaggered (We will use the term destaggering to denote the collection of adjacent pilot samples which are transmitted on different frequency interlaces. For the LTE standard, pairs of pilot transmissions are offset by 45 kHz in their frequency domain locations. The interlace offset is tracked by the variable $\phi(n)$, which for an LTE system takes on two values, 0 and 1. Furthermore, we use the label RS to denote reference-signal (an LTE specific term for pilots). Vector as follows:

$$\hat{H}_{DS,RS}(n)$$

Which is updated at each n according to the phase $\phi(n)$: i.e., if $\phi(n)=0$ the terms in $\hat{H}_{DS,RS}(n)$ corresponding to even indices are overwritten by the entries in $\hat{H}_{RS}(n)$ (and the other terms are not updated), while for $\phi(n)=1$ the terms with odd indices are overwritten.

We can perform a straightforward interpolation by taking the inverse FFT of these vectors, zero-padding the result, and taking a larger FFT of the result which covers all resource elements employed in the link. This also allows additional processing gain from selectively windowing the resulting sample domain sequence according to measure of reliability (e.g. thresholding); i.e. the final channel broadband channel estimate is given by the following:

$$\hat{H} = V_N Z_{N,M} V_M^* \hat{H}_{DS,RS}$$

Where:
$V_M$ is an M×M DFT matrix.
$Z_{N,M}$ is an N×M zero padding matrix, i.e. the upper M×M block of $Z_{N,M}$ is the identity matrix, and all other entries are zero.
$V_N$ is an N×N DFT matrix.
$\hat{H}_{DS,RS}$ is a destaggered frequency domain RS vector formed by combining two consecutive pilot vectors for a net sampling periodicity of 3 tones.
The dependency on p, q, and $n_s$ is dropped.

We refer to this estimator as the IFFT-Window-FFT (IWF) solution. This approach suffers near the edges of the band, since the sample support for the interpolation abruptly ends. The resulting loss is essentially Gibb's phenomenon, and a resulting link performance loss is seen for data allocations which are concentrated at the band edge.

Figure 2:
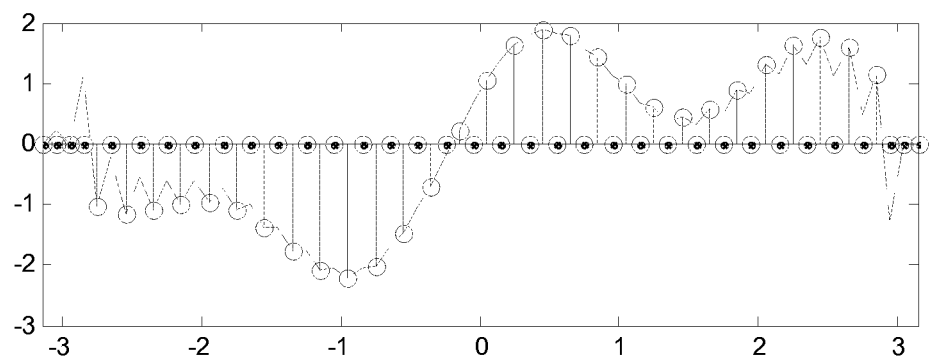
FIG. 2 is a graph illustrating decimated and interpolation response in a frequency domain channel.

For an illustration of this edge problem, consider the frequency domain channel in FIG. 1 and FIG. 2. FIG. 1 illustrates the true channel and the range over which pilots are available. FIG. 2 shows the decimated pilot samples and the results of the IWD estimator. While the estimator is good in the middle of the band, the edge effects are pronounced. For an LTE system, this limits the available throughput for any resource block (12 contiguous tones, or 180 kHz, in the frequency domain extending over 0.5 ms) allocation that includes band edges, and is pronounced for any PDSCH allocations that are concentrated at either band edge.

One alternative to the IFFT/FFT approach is to employ the full minimum mean-squared error estimator for the broadband channel. This estimator requires an M×M matrix multiplication (and inverse), which is generally too expensive for practical consideration (for example, a 20-MHz LTE system requires a 400×400 complex matrix inverse).

An Overview of Edge-Tone Distortion Mitigation Options

An approach to dealing with the band-edge distortion inherent in straightforward interpolation estimation procedures is to artificially modify either the pilot estimates around the edge or the resulting channel estimate. For example, we could give up on the edges and taper the edge estimates towards zero (i.e., apply a window in the frequency domain). Equivalently (from the perspective of the resulting performance), we could force the computed log likelihood ratios (LLRs) for all coded bits that come from band edge symbols to zero; i.e., declare erasures at the decoder input. These techniques essentially reduce the spectral efficiency of the overall link in exchange for a simple channel estimation procedure. For a single user link wherein the user occupies all tones or for systems employing a large degree of frequency diversity, this approach is reasonable when there are a large number of subcarriers; i.e., the coding loss from the edge bits is essentially negligible. For example, in an LTE system with a single PDSCH channel employing 100 resource blocks, the resulting coding loss is 2%, even if we throw out the edge resource blocks (it is 1% per resource block). The interleaved turbo-code structure is fairly resilient to successive erasures of this sort, and the resulting performance is likely quite tolerable.

The problem is for systems employing either a relatively small number of subcarriers and/or where the PDSCH is allocated near the band edges. Three distinct techniques that have been discussed for dealing with this edge-tone distortion:

Edge-tone extrapolation, i.e. the invention described herein. Virtual reference signals are inserted at the band edges immediately following descrambling at the FFT output buffer to extend the effective pre-IFFT sample support. This is the desired approach for the Odyssey baseband core, as it results in a high-quality time domain CIR estimate (useful for other purposes, such as FTL/TTL). Since the initial Odyssey work on this problem, it has been noted that there is a growing emphasis on extrapolation to mitigate edge effects in the literature[1,2].

[1]Y. Li, L. J. Cimini, N. R. Sollenberger, "Robust Channel Estimation for OFDM Systems with Rapid Dispersive Fading Channel," IEEE trans. Commun., vol. 46, no. 7, pp. 902-915, July 1998.

[2]M Ozdemir and H. Arslam, "Channel Estimation for Wireless OFDM Systems." IEEE Commum. Surveys and Tutorials, Vol. 9, no. 2, pp. 18-48. 2007.

Post-estimation MMSE cleanup of edge tones. This is the approach proposed for the Espresso LTE prototype, where the approach is termed EMMSE[3]

[3]Espresso Mobile Station System HLD, v0, available in perforce.

Frequency domain tone-tapering. In this approach, a window is applied to the FFT output (before writing to the tone RAM) to taper the overall channel response to zero at the band edges. This results in a de-emphasis of the edge tones in the overall demodulation processing, and appears to be most applicable for broadband broadcast systems.

Given M samples of the channel frequency response vector, $\hat{H}_{RS,DS}$, we first extrapolate the edge tones to form a length K>M vector $\tilde{H}_{RS}$; i.e., form:

$$\tilde{H}_{RS} = \begin{bmatrix} \hat{H}_{DS,RS,+} \\ \hat{H}_{DS,RS} \\ \hat{H}_{DS,RS,-} \end{bmatrix} = \begin{bmatrix} A_+ \\ I \\ A_- \end{bmatrix} \hat{H}_{RS,DS} = A\hat{H}_{DS,RS}$$

for a suitable chosen pair of matrices $(A_+, A_-)$. We then perform IWF estimation on the resulting vector $\tilde{H}_{RS}$. For convenience, we expand the definition of $\hat{H}_{RS,DS}$ to the following:

$$\hat{H}_{RS,DS} = D_M H + \eta,$$

$$D_M = [0 D 0]$$

Here we defined the matrix $D_M \in \mathfrak{R}^{M \times N}$ which acts to both decimate the frequency response and zero-pad the edges of the resulting vector to a useful FFT length M. The estimator is then given by the following IWF formulation:

$$\hat{H}(A_+, A_-) = VZW^* Q_K^* \tilde{H}_{RS}$$

where $Q_k$ is the M×N decimation matrix (formed from every $M^{th}$ row of the N×N identity matrix), and hence its transpose is an upsampling matrix (it acts to insert zeros between the elements of $\hat{H}_{RS}$). We can evaluate the choice of extrapolation matrices by the resulting mean-squared error:

$$\gamma(A_+, A_-) = E\{|\hat{H}(A_+, A_-) - H|^2\}$$

The solution is the following, $$\hat{A}_+ = K_{RS,+} R_{RS}^{-1}$$

where:

$$K_{RS,+} = E\{\hat{H}_{DS,RS,+} \hat{H}_{DS,RS,+}^*\}$$

$$\hat{H}_{DS,RS,+} = [I 0 0] Q_K H + \eta_+$$

$$R_{RS} = E\{\hat{H}_{DS,RS} \hat{H}_{DS,RS}^*\}$$

The solution is a flavor of the usual MMSE estimator, where we first whiten the data and then project onto the data of interest ($H_{RS,+}$) through the cross-correlation operation. Similarly, we have the following:

$$\hat{A}_- = K_{RS,-} R_{RS}^{-1}.$$

We note that for a wide-sense stationary frequency domain process $\hat{H}_{DS,RS}^*$, the matrices $\hat{A}_-$ and $\hat{A}_+$ have elements which are complex conjugates, i.e. $(\hat{A}_-)_{k,l} = (\hat{A}_+)_{k,l}^*$ due to the complex symmetry of the underlying correlation sequence across frequency-domain lags.

Length Constraints

The preceding analysis assumes that we estimate the virtual pilots by using the entire support of the reference signals. In practice, this leads to a large complexity in the implementation. We now consider the problem wherein we constrain ourselves to a processing depth of L<M. In particular, we use the following model:

$$\tilde{H}_{RS} = \begin{bmatrix} \hat{H}_{DS,RS,(L)^+} \\ \hat{H}_{DS,RS} \\ \hat{H}_{DS,RS,(L)^-} \end{bmatrix} \begin{bmatrix} [A_{(L)^+} \ 0] \\ I \\ [0 \ A_{(L)^-}] \end{bmatrix} \hat{H}_{DS,RS} = A_{(L)} \hat{H}_{DS,RS} \quad (0.1)$$

where and $A_{(L)^+}$ and $A_{(L)^-}$ have L columns and K rows (we extrapolate K terms from L reference signals [We only compute K/2 such terms per RS update, as the input data to the IFFT is staggered]).

The analysis of the last section is essentially unchanged, and we find the following:

$$\hat{A}_{(L)^+} = K_{RS,(L)^+} (R_{RS,(L)^+})^{-1}$$

$$\hat{A}_{(L)^-} = K_{RS,(L)^-} (R_{RS,(L)^-})^{-1} \quad (0.2)$$

where the correlation matrices are taken with respect to the L edge tones in the pilot vector.

We do not need to track the entire destaggered vector $\hat{H}_{RS,DS}$, only those terms which are used in the extrapolation. This is of particular relevance to the Odyssey design, as the actual destaggering is done in the time domain.

Implementation Details

Figure 3:
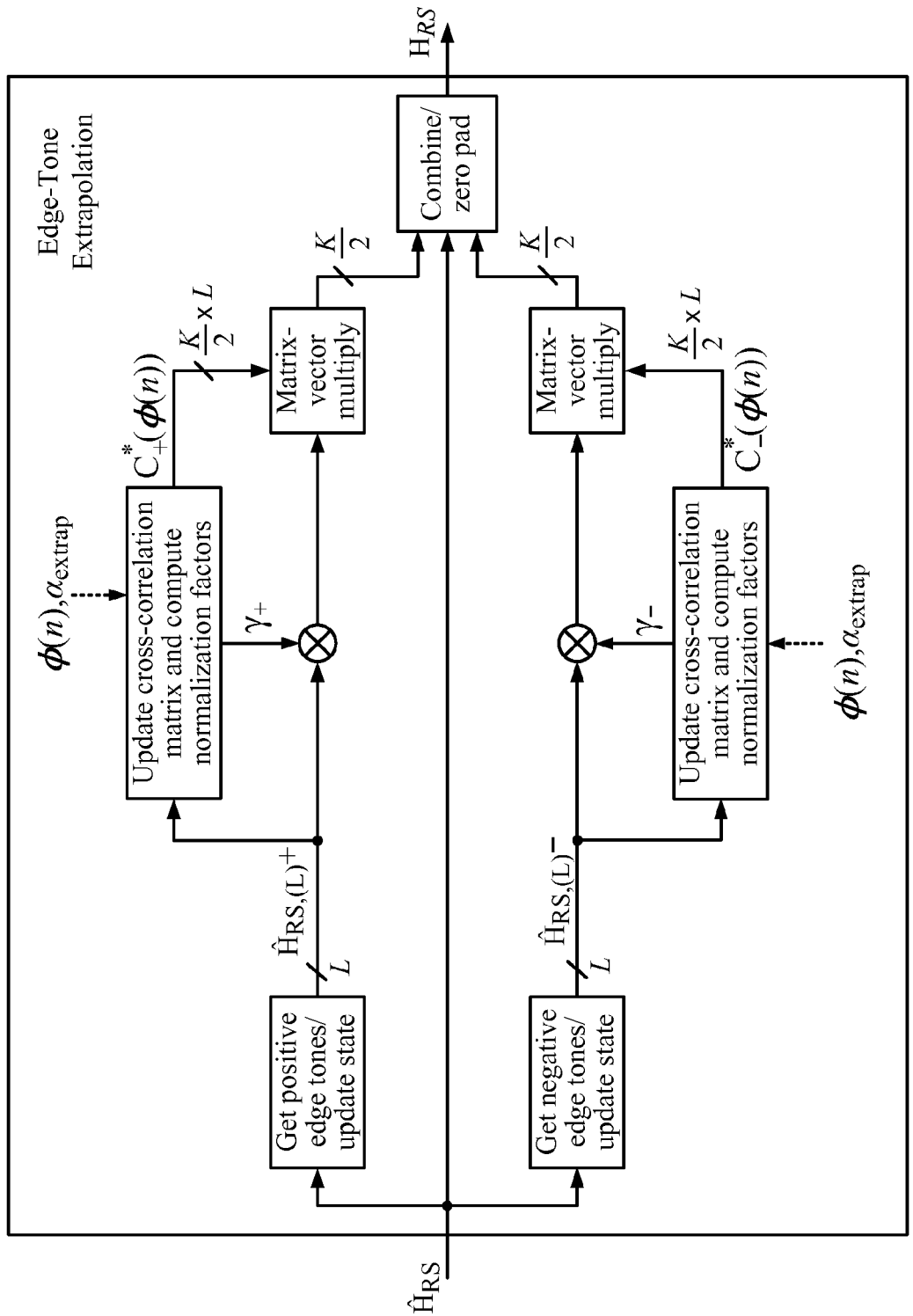
FIG. 3 depicts an extrapolation block for a two-phase interlace structure.

The extrapolation engine can be decomposed into multiple computational blocks, as shown in FIG. 3. The basic processing steps are:

Update internal destaggered states

Update estimated cross-correlation matrices $C_+$ and $C_-$

Update the estimates at the norm of the edge-tone powers and apply the inverse of these two ($\gamma_+$ and $\gamma_-$) to the edge tones Multiply the edge-tone vectors by the appropriate sub matrices $C_+(\phi(n))$ and $C_-(\phi(n))$, where:

$$(C_+(0))_{k,l} = (C_+)_{2k+1,l}$$

$$(C_+(2))_{k,l} = (C_+)_{2k,l}$$

$$(C_-(0))_{k,l} = (C_-)_{2k,l}$$

$$(C_-(0))_{k,l} = (C_-)_{2k+1,l} \quad (3.10)$$

We apply every other row of $C_+$ and $C_-$ to the local destaggered state vectors, with an offset of either 0 or 1 in the row ordering, depending on $\phi(n)$ and the edge location (positive or negative). This results in K/2 output samples per band edge, which are then inserted to the raw reference signal vector. Additional zeros are padded, as needed.

Cross-Correlation Matrix and Normalization Factor Estimation

The cross-covariance matrix tracking involves the estimation and filtering of K+L−1 unique entries for each band edge; i.e. letting:

$$c_+(l;n) = \alpha \hat{H}_{DS,RS}\left(\frac{M}{2}; n\right) \hat{H}_{DS,RS}^*\left(\frac{M}{2} - 1 - l; n\right) + (1-\alpha) c_+(l; n-1)$$

$$c_-(l;n) = \alpha \hat{H}_{DS,RS}\left(-\frac{M}{2}; n\right) \hat{H}_{DS,RS}^*\left(-\frac{M}{2} + 1 + l; n\right) + (1-\alpha) c_-(l; n-1)$$

where $H_{DS,RS}(m;n)$ is the destaggered reference signal at decimated tone index m and update time n, we have the following:

$$C_+(n) = \begin{bmatrix} c_+(0;n) & c_+(1;n) & \ldots & c_+(L-1;n) \\ c_+(1;n) & \ldots & c_+(L-1;n) & c_+(L;n) \\ \vdots & \ddots & \ddots & \vdots \\ c_+(K-1;n) & c_+(K;n) & \ldots & c_+(K+L-1;n) \end{bmatrix}$$

$$C_-(n) = \begin{bmatrix} c_-(0;n) & c_-(1;n) & \ldots & c_-(L-1;n) \\ c_-(1;n) & \ldots & c_-(L-1;n) & c_-(L;n) \\ \vdots & \ddots & \ddots & \vdots \\ c_-(K-1;n) & c_-(K;n) & \ldots & c_-(K+L-1;n) \end{bmatrix}$$

Each row of $C_+(n)$ differs from the rows above and below it by two terms. For this reason, the size LK matrices only require the calculation of L+K−1 unique terms.

The normalization values are computed via the following:

$$\lambda_+(n) = \alpha\left(\sum_{l=0}^{L-1}\left|H_{DS,RS}\left(\frac{M}{2}-l-1;n\right)\right|^2\right) + (1-\alpha)\lambda_+(n-1),\ \gamma_+(n) = \frac{1}{\lambda_+}$$

$$\lambda_-(n) = \alpha\left(\sum_{l=0}^{L-1}\left|H_{DS,RS}\left(-\frac{M}{2}+l;n\right)\right|^2\right) + (1-\alpha)\lambda_-(n-1),\ \gamma_-(n) = \frac{1}{\lambda_-}$$

A Closer Look at the Matrix Multiplies

For each RS update, we must only output the extrapolated tones corresponding to the current phase, $\phi(n)$. For example, if we apply the full matrix multiply to the internal, destaggered state vectors to form:

$$H_{ex,+}^{full} = C_+ * \hat{H}_{RS,(L)}^+$$

$$H_{ex,-}^{full} = C_- * \hat{H}_{RS,(L)}^-$$

we would then prune out every other sample to match the actual staggered reference signal vector $\hat{H}_{RS}$ for the current RS, as shown in FIG. 3. Clearly this is a waste of power, as every other output symbol is discarded. Hence the pruning of the extrapolation matrices defined in Equation (3.10) is employed to limit the matrix-vector multiply to only compute those terms needed at each RS.

Variations that Easily Fit within the Scope of this Disclosure

In addition to the detailed example given above, there are several obvious extension and modify cations to the basic idea.
 1. Update the band edge correlation matrices using rank one matrix inverses (matrix inversion lemma, or the Woodbury identity):

$$R_{RS}(n) = \alpha R_{RS}(n-1) + \beta \hat{H}_{RS}(n)\hat{H}_{RS}^*(n)$$

$$R_{RS}^{-1}(n) = \frac{1}{\alpha}\left(R_{RS}^{-1}(n-1) + \frac{\beta R_{RS}^{-1}(n-1)\hat{H}_{RS}(n)\hat{H}_{RS}^*(n)R_{RS}^{-1}(n-1)}{\alpha + \beta \hat{H}_{RS}^*(n)R_{RS}^{-1}(n-1)\hat{H}_{RS}(n)}\right)$$

2. Track the prediction filters through independent lms/rls updates, where the filters are trained across the frequency tones.
 3. Explicitly estimate the edge tone correlations from the time domain CIR vector (possibly averaged) through an averaging and FFT operation.

These variations can be easily flushed out in an actual patent submission.

Link Level Performance Results

In this section we consider the performance of the edge tone extrapolation defined in the previous sections over a subset of the so-called LTE RAN4 "conformance" cases. In each case we have limited the UE PDSCH bandwidth allocation to two resource blocks lying on the positive band edge (i.e. the user data was concentrated over the 24 tones closest to the band edge). The performance curves with and without edge tone extrapolation are compared to the Genie bound (perfect channel knowledge at the receiver). We notice that as the channel becomes more dispersive (i.e. for the ETU channels, which have a large delay spread), the relative performance gain for extrapolation drops, and that as the required spectral efficiency increases, the extrapolation approach is required to even meet a ten percent target BLER. The QPSK results are not included, as the edge effects are not noticeable at the corresponding operating regions.

Comparisons with Other Solutions

There are at least two other approaches to edge tone compensation that are appropriate for the LTE standard, namely:
 post estimation cleanup through a localized MMSE matrix multiply[3] and
 pre estimation frequency domain windowing.

In this section we will briefly discuss the relative merits and drawbacks to each of these, when compared to the extrapolation methodology.

Post Estimation Cleanup

In the Espresso prototype, it will be possible to overwrite the edge tones by an explicit (localized) MMSE matrix multiply after the IFFT/FFT interpolation is carried out. In particular the correlation structure of the reference signals is estimated by assuming the channel to have a uniform power profile over the (estimated) delay spread. With this assumption, the LMMSE estimates of the edge tones can be obtained from a fixed number of (edge) reference signal tones. If we consider only the positive edge tones, let us denote the K desired edge resource elements by f and the L edge reference signals by f, i.e.

$$f = \begin{bmatrix} H_{RS}(N) \\ H_{RS}(N-1) \\ \vdots \\ H_{RS}(N-K+1) \end{bmatrix},\ x = \begin{bmatrix} \hat{H}_{DS,RS}(N) \\ \hat{H}_{DS,RS}(N-1) \\ \vdots \\ \hat{H}_{DS,RS}(N-L+1) \end{bmatrix} \quad (0.1)$$

We then directly estimate the edge tones via the matrix equation:

$$fi = Bx \quad (0.2)$$

where $$B = E\{fx^*\}(E\{xx^*\})^{-1} = K_{fx}R_{xx}^{-1} \quad (0.3)$$

If we model the CIR as a random process with a uniform power profile over the delay spread, and with uncorrelated taps, we can solve for the interpolation matrix B in closed form as a function of the delay spread and geometry. The approach proposed in Espresso is to precompute several possible such matrices by quantizing the delay spread and geometries, and allowing the DSP to chose from the candidates. The corresponding B matrix is then written to a hardware engine and the edge tones at the FFT output (after time domain CIR processing) are overwritten by the corresponding $\hat{f}$ estimates.

Of the above considerations, the last three seem to be the most worrisome to commercial deployment. The uniform prior model is generally worst case, so at the least should lead to a robust approach. It is hoped, however, that the data-driven extrapolation can exploit available gains when the true channel model has a power profile which is not uniform (Note that most wireless channel models do not have uniform power profiles).

The last point is most obvious when the system employs a relatively small bandwidth. In this case, the Gibbs effects from the limited pilot support carry over to all tones in the system. The virtual pilot support.

Pre Estimation Windowing

Another approach which has been employed to mitigate edge tone effects is to pre-process the entire frequency domain vector $\hat{H}_{RS}$ by a suitable chosen windowing sequence which forces the edge tones to taper off to small values. This reduces the variation in the frequency response at the band edges, and allows for a smoother overall response. This could either be applied to all tones (i.e. at the tone RAM input) and be left uncompensated or only to the reference signals at the channel estimation IFFT input, in which case the window must be undone prior to demodulation. The main benefits of this approach lie in improved estimation performance in the center of the frequency band, as illustrated in the simulation curves below for a 20 MHz LTE. The frequency domain windowing employed a Hamming window and there was no interference present in the system. The resulting mean squared error was averaged over five thousand RS realizations at the Doppler frequencies indicated in the figure titles.

Note that in each case, the windowing (or tapering) approach has a mean squared error at the band edges that roughly matches the straightforward IFFT/FFT approach while the extrapolation approach outperforms both of these by 15-30 dB at the edges. In light of these performance comparisons, we conclude that the windowing approach is most appropriate for broadband resource allocations, such as are found in broadcast systems of the sort. Note also that in a practical system, interference (both external and internal) will lead to a mean-squared error floor well above those indicated in the figures, so that the edge tone values indicate the practical system limitations. Notice also that the system simulated employed $v_{shift}=0$, for which there is a pilot at the first band edge. This is why the left band edge performance is better than that observed at the right band edge for each approach.

Finally, notice that the improved edge tone performance spans multiple resource blocks, and this relates to the comparison to a direct MMSE calculation of the edge resource elements mentioned in the previous section; as the latter approach would require a matrix multiply whose size is growing linearly as twelve times the number of compensated resource blocks.

Figure 4:
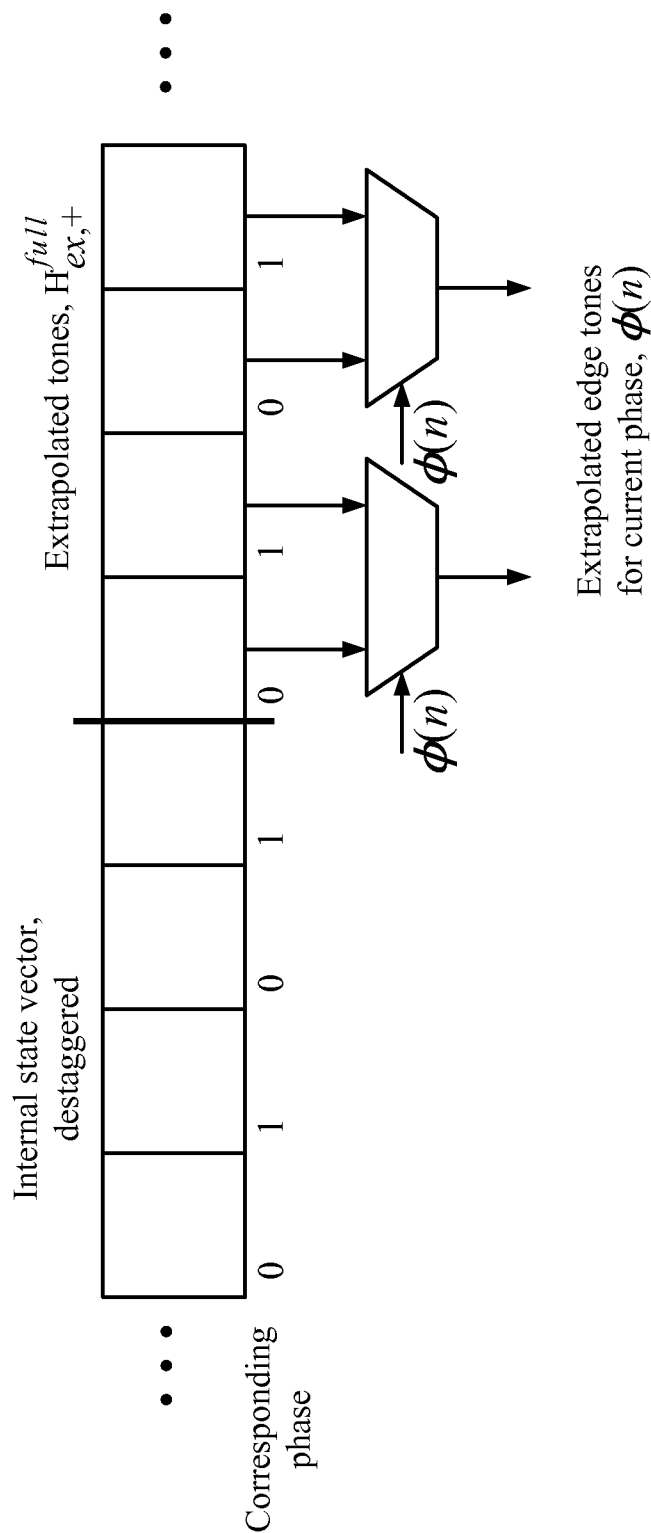
FIG. 4 is a depiction of equivalent puncturing for positive edge tones, output read locations alternate with phase, ø (n).
Figure 5:
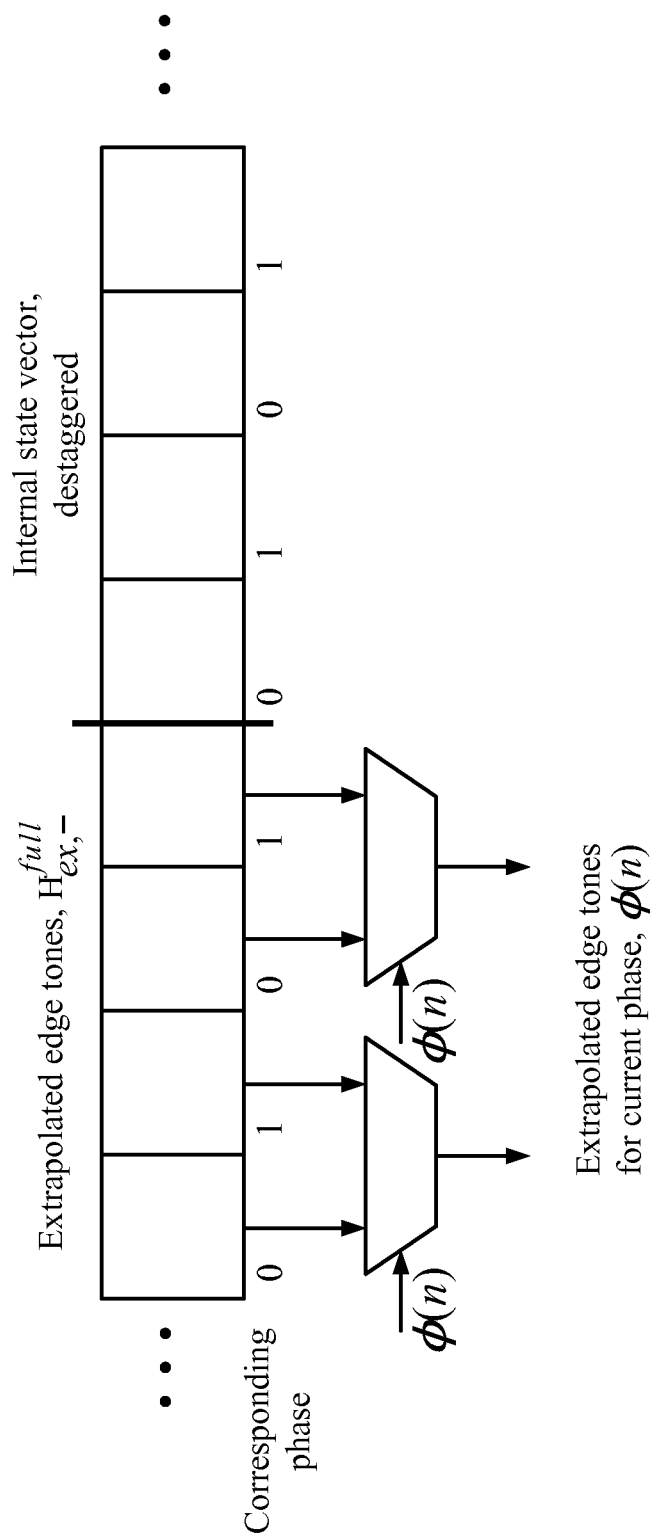
FIG. 5 is a is depiction of equivalent puncturing for negative edge tones, output read locations alternative with phase, ø (n).
Figure 6:
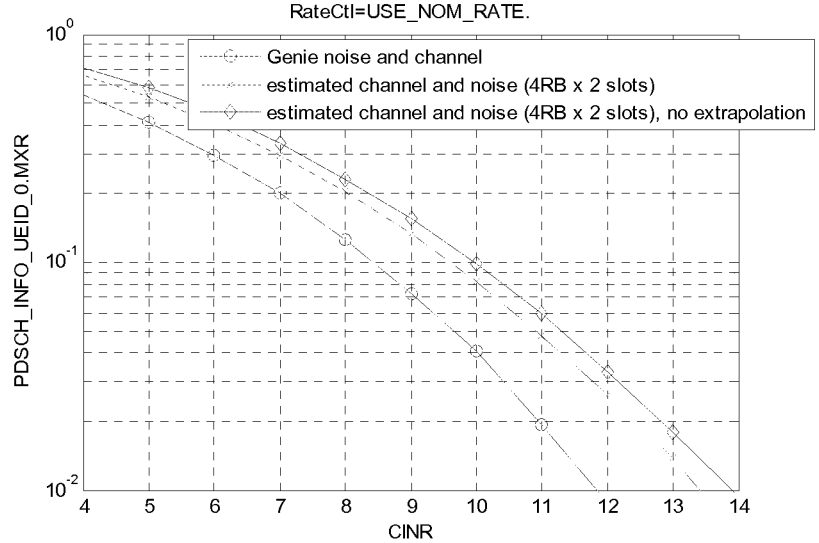
FIG. 6 is a graph comparing performance curves with and without edge tone extrapolation to perfect channel knowledge at the receiver under certain specified conditions.
Figure 7:
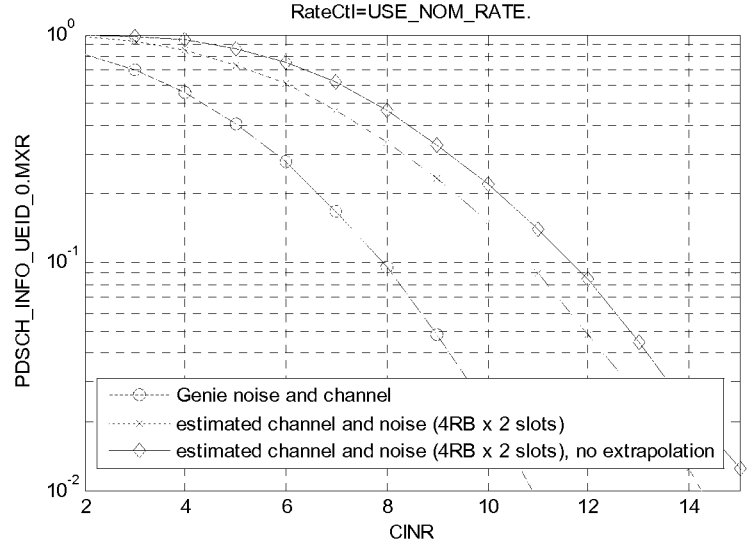
FIG. 7 is a graph comparing performance curves with and without edge tone extrapolation to perfect channel knowledge at the receiver under yet another set of specified conditions.
Figure 8:
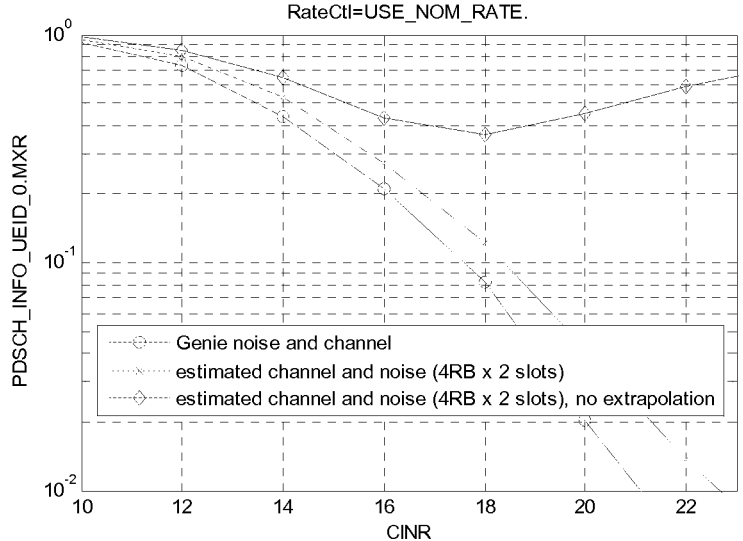
FIG. 8 is a graph comparing performance curves with and without edge tone extrapolation to perfect channel knowledge at the receiver under a still further set of specified conditions.
Figure 9:
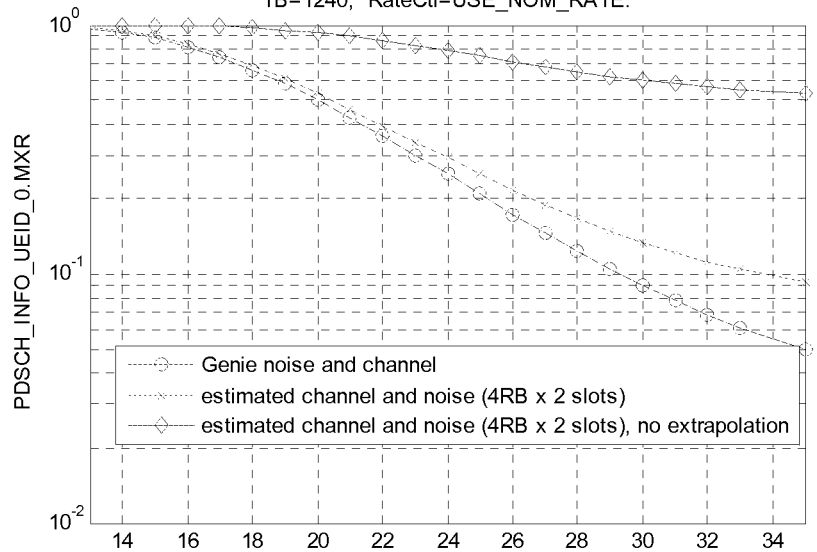
FIG. 9 is a graph comparing performance curves with and without edge tone extrapolation to perfect channel knowledge at the receiver under yet another set of specified conditions.
Figure 10:
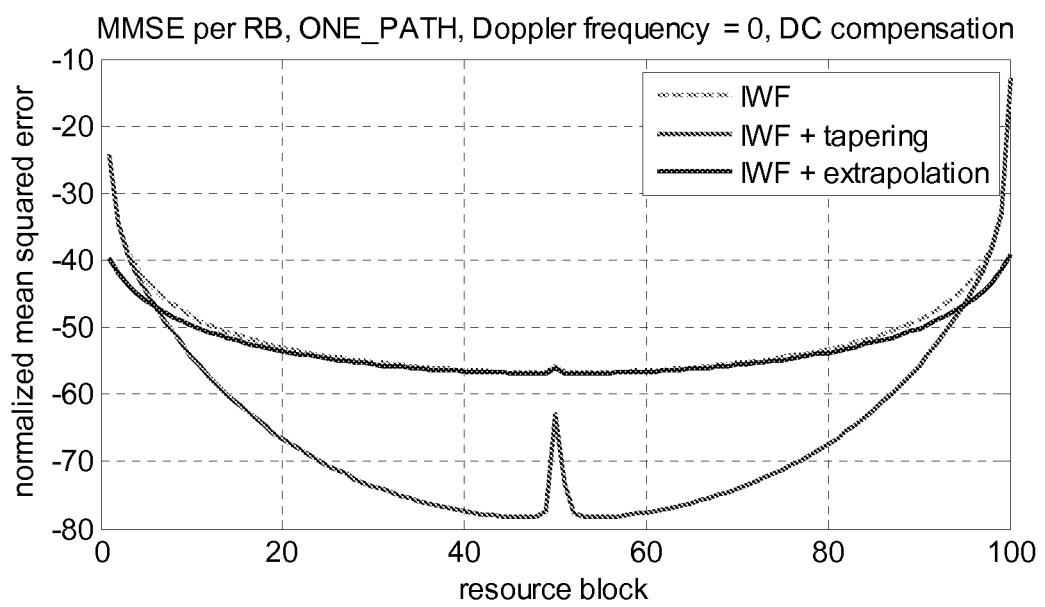
FIG. 10 is a graph of the comparison of IFFT/FFT, frequency domain windowing plus IFFT/FFT, and extrapolation plus IFFT/FFT channel estimation approaches for a single path fading channel.
Figure 11:
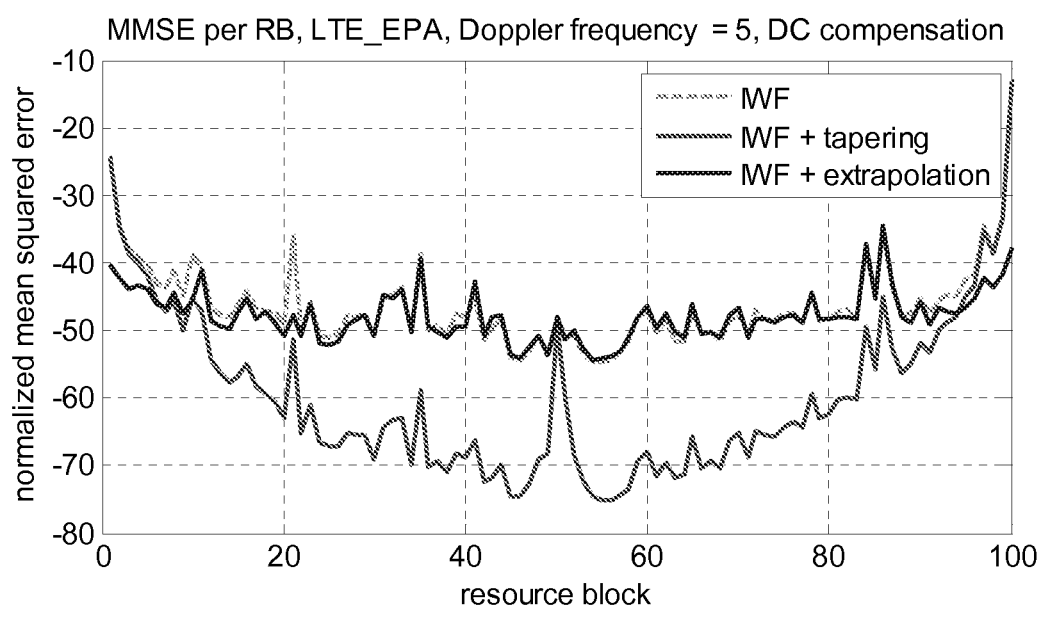
FIG. 11 is a graph of the comparison of IFFT/FFT, frequency domain windowing plus IFFT/FFT, and extrapolation plus IFFT/FFT channel estimation approaches for a single path fading channel.
Figure 12:
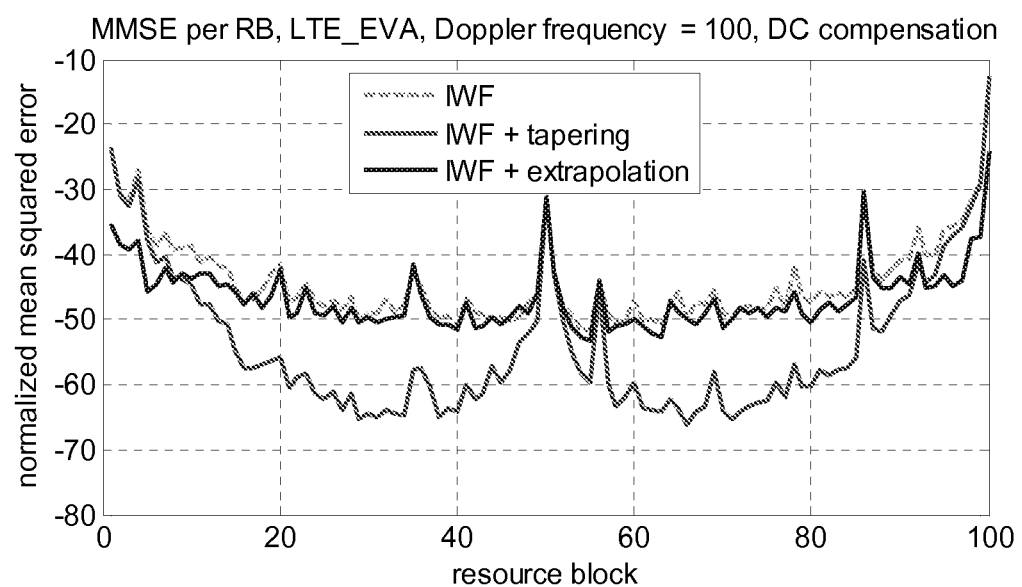
FIG. 12 is a graph of the comparison of IFFT/FFT, frequency domain windowing plus IFFT/FFT, and extrapolation plus IFFT/FFT channel estimation approaches for the vehicular A channel (100 Hz Doppler).

In the context of the advance to the art remaining drawings FIGS. 4 through 12 will exemplify or illustrate embodiments that are to be construed as preferred or advantageous over other embodiments, and wherein:

FIG. 4 is a depiction of equivalent puncturing for positive edge tones, output read locations alternate with phase, ø (n);

FIG. 5 is a depiction of equivalent puncturing for negative edge tones, output read locations alternative with phase, ø (n);

FIG. 6 is a graph comparing performance curves with and without edge tone extrapolation to perfect channel knowledge at the receiver under certain specified conditions;

FIG. 7 is a graph comparing performance curves with and without edge tone extrapolation to perfect channel knowledge at the receiver under yet another set of specified conditions;

FIG. 8 is a graph comparing performance curves with and without edge tone extrapolation to perfect channel knowledge at the receiver under a still further set of specified conditions;

FIG. 9 is a graph comparing performance curves with and without edge tone extrapolation to perfect channel knowledge at the receiver under yet another set of specified conditions;

FIG. 10 is a graph of the comparison of IFFT/FFT, frequency domain windowing plus IFFT/FFT, and extrapolation plus IFFT/FFT channel estimation approaches for a single path fading channel;

FIG. 11 is a graph of the comparison of IFFT/FFT, frequency domain windowing plus IFFT/FFT, and extrapolation plus IFFT/FFT channel estimation approaches for a single path fading channel; and FIG. 12 is a graph of the comparison of IFFT/FFT, frequency domain windowing plus IFFT/FFT, and extrapolation plus IFFT/FFT channel estimation approaches for the vehicular A channel (100 Hz Doppler).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method of estimating a channel response of a wireless communication channel over a predetermined frequency band, comprising:

receiving a wireless communication in the frequency band;

producing in response to the wireless communication a plurality of virtual pilot values respectively associated with a plurality of frequencies outside the frequency band, including combining a vector of actual pilot values with each of a plurality of coefficient vectors, wherein each said coefficient vector contains a plurality of coefficients, and wherein said actual pilot values are respectively derived from pilot signals respectively received on predetermined frequencies in said wireless communication; and applying interpolation relative to said actual pilot values and said virtual pilot values to obtain channel response estimates for frequencies in the frequency band other than said predetermined frequencies.

2. The method of claim 1, wherein said plurality of coefficient vectors is different in number than a dimension of said vector of actual pilot values.

3. The method of claim 2, wherein said plurality of virtual pilot values and said plurality of coefficient vectors are equal in number.

4. The method of claim 1, wherein said plurality of virtual pilot values and said plurality of coefficient vectors are equal in number.

5. The method of claim 1, wherein said combining includes multiplying said vector of actual pilot values by each said coefficient vector.

6. The method of claim 1, wherein said correlation vectors are indicative of a correlation structure of the channel response.

* * * * *